US010133935B2

(12) United States Patent
Child et al.

(10) Patent No.: US 10,133,935 B2
(45) Date of Patent: Nov. 20, 2018

(54) DOORBELL CAMERA EARLY DETECTION

(71) Applicant: Vivint, Inc., Provo, UT (US)

(72) Inventors: Michael D. Child, Lehi, UT (US);
Craig Matsuura, Draper, UT (US);
Dean Brederson, Salt Lake City, UT (US); JonPaul Vega, Highland, UT (US)

(73) Assignee: Vivint, Inc., Provo, UT (US)

( * ) Notice: Subject to any disclaimer, the term of this patent is extended or adjusted under 35 U.S.C. 154(b) by 136 days.

(21) Appl. No.: 14/596,047

(22) Filed: Jan. 13, 2015

(65) Prior Publication Data
US 2016/0203370 A1 Jul. 14, 2016

(51) Int. Cl.
*H04N 7/18* (2006.01)
*G06K 9/00* (2006.01)
*G08B 13/196* (2006.01)

(52) U.S. Cl.
CPC ..... *G06K 9/00771* (2013.01); *G06K 9/00288* (2013.01); *G08B 13/19656* (2013.01); *H04N 7/186* (2013.01); *G08B 13/196* (2013.01)

(58) Field of Classification Search
CPC ........... G06K 9/00771; G06K 9/00288; H04N 7/186; G08B 13/196
See application file for complete search history.

(56) References Cited

U.S. PATENT DOCUMENTS

| 4,764,953 A * | 8/1988 | Chern | H04M 11/025 379/102.06 |
| 5,184,223 A | 2/1993 | Mihara | |
| 5,428,388 A * | 6/1995 | von Bauer | H04N 7/186 348/155 |
| 6,301,447 B1 | 10/2001 | Jackson et al. | |
| 6,583,813 B1 * | 6/2003 | Enright | G06Q 20/18 348/143 |
| 7,015,943 B2 | 3/2006 | Chiang | |
| 7,187,279 B2 * | 3/2007 | Chung | G08B 13/19645 340/506 |
| 7,263,182 B2 * | 8/2007 | Allen | H04M 11/025 379/159 |
| 7,389,914 B1 * | 6/2008 | Enright | G06Q 20/042 235/379 |
| 7,450,015 B2 * | 11/2008 | Singer | G07C 9/00111 340/5.64 |

(Continued)

FOREIGN PATENT DOCUMENTS

JP  2014-506034 A  3/2014

OTHER PUBLICATIONS

PCT International Search Report for International Application No. PCT/US2015/068139, dated Apr. 18, 2016 (3 pp.).

*Primary Examiner* — Sath V Perungavoor
*Assistant Examiner* — Philip Dang
(74) *Attorney, Agent, or Firm* — Holland & Hart LLP

(57) ABSTRACT

Systems and methods for visitor detection using security and/or automation systems include detecting an event at a doorway, capturing an image at the doorway associated with the event, capturing a video at the doorway associated with the event, delivering the image with a notice of the event to a recipient for viewing, and automatically uploading the video for viewing upon capturing the video. The video is available for selective viewing by the recipient upon being uploaded.

19 Claims, 12 Drawing Sheets

(56) References Cited

U.S. PATENT DOCUMENTS

| | | | | |
|---|---|---|---|---|
| 7,504,942 B2* | 3/2009 | Marman | | G06K 9/00362 340/541 |
| 7,533,805 B1* | 5/2009 | Enright | | G06Q 20/10 235/379 |
| 7,583,191 B2* | 9/2009 | Zinser | | G08B 13/196 340/539.1 |
| 7,683,940 B2* | 3/2010 | Fleming | | G11B 27/034 348/207.1 |
| 7,847,820 B2* | 12/2010 | Vallone | | G06K 9/00288 348/143 |
| 7,945,032 B2* | 5/2011 | Elberbaum | | H04N 7/186 348/14.04 |
| 8,054,340 B2* | 11/2011 | Miki | | H04N 5/772 348/143 |
| 8,120,459 B2* | 2/2012 | Kwak | | H04L 12/64 340/5.2 |
| 8,139,098 B2* | 3/2012 | Carter | | H04N 7/142 348/14.06 |
| 8,204,273 B2* | 6/2012 | Chambers | | G06K 9/00771 382/103 |
| 8,302,856 B1* | 11/2012 | Grimm | | G07F 19/207 235/379 |
| 8,350,694 B1* | 1/2013 | Trundle | | G08B 25/08 340/539.11 |
| 8,358,342 B2* | 1/2013 | Park | | G06K 9/00771 348/143 |
| 8,780,201 B1 | 7/2014 | Scalisi et al. | | |
| 8,897,433 B2 | 11/2014 | Mota et al. | | |
| 2003/0193563 A1 | 10/2003 | Suzuki | | |
| 2004/0080615 A1* | 4/2004 | Klein | | G08B 13/19669 348/143 |
| 2004/0085205 A1* | 5/2004 | Yeh | | G08B 13/19634 340/540 |
| 2005/0179539 A1* | 8/2005 | Hill | | G08B 13/19632 340/539.1 |
| 2006/0279628 A1* | 12/2006 | Fleming | | G11B 27/034 348/143 |
| 2007/0115390 A1* | 5/2007 | Makara | | H04N 7/186 348/552 |
| 2007/0182818 A1 | 8/2007 | Buehler | | |
| 2008/0111684 A1 | 5/2008 | Zinser | | |
| 2008/0198006 A1 | 8/2008 | Chou | | |
| 2009/0251545 A1* | 10/2009 | Shekarri | | G06Q 10/00 348/158 |
| 2011/0018998 A1* | 1/2011 | Guzik | | H04N 21/21 348/143 |
| 2011/0029370 A1 | 2/2011 | Roeding et al. | | |
| 2011/0164108 A1 | 7/2011 | Bates et al. | | |
| 2011/0248818 A1 | 10/2011 | Hashim-Waris | | |
| 2012/0019674 A1* | 1/2012 | Ohnishi | | G08C 17/00 348/207.1 |
| 2012/0069131 A1* | 3/2012 | Abelow | | G06Q 10/067 348/14.01 |
| 2012/0086625 A1 | 4/2012 | Takeda et al. | | |
| 2012/0218301 A1* | 8/2012 | Miller | | G02B 27/017 345/633 |
| 2012/0314901 A1 | 12/2012 | Hanson et al. | | |
| 2013/0046477 A1 | 2/2013 | Hyde et al. | | |
| 2013/0057695 A1 | 3/2013 | Huisking | | |
| 2013/0215276 A1 | 8/2013 | Cho | | |
| 2014/0015967 A1 | 1/2014 | Moore et al. | | |
| 2014/0240504 A1 | 8/2014 | Cho | | |
| 2014/0267716 A1 | 9/2014 | Child et al. | | |

\* cited by examiner

DOORBELL CAMERA EARLY DETECTION

BACKGROUND

The present disclosure, for example, relates to security and/or automation systems, and more particularly to systems and methods for detecting visitors via a doorbell camera.

Security and automation systems are widely deployed to provide various types of communication and functional features such as monitoring, communication, notification, and/or others. These systems may be capable of supporting communication with a user through a communication connection or a system management action.

Typically, doorbell cameras either take a picture or begin to record video when the doorbell is actuated. The picture or video may be sent the homeowner (e.g., via a control panel of the security and/or automation system) so the homeowner can decide whether or not to respond to the visitor (e.g., with an audio message or by opening the door). The picture often provides little useful information since the camera is usually obstructed by the visitor's hand at the time the picture is taken. The video often is delayed in being displayed on the control panel due to buffering, etc. The homeowner's inability to identify the visitor in a timely manner due to the unhelpful picture or the delay in watching the video may result in the visitor departing before the homeowner can respond.

SUMMARY

The present disclosure is directed to early detection of visitors at a building or property. The early detection may include capturing images or video of one or more persons at an entry to the building or property. The image and/or video may be delivered to a user (e.g., homeowner) along with a notice regarding arrival of the visitor at the entry. The image may be used as a placeholder for initial identification of the visitor. The user may choose to also view the video for further identification of the visitor and/or a visitor event at the entry. The video may be buffered prior to the user selecting the video for viewing. The user may communicate a response to the visitor. In some examples, the user may operate a door, lighting, or other security and/or automation feature in response to the received notice.

The image and/or video that is delivered to the user may be from a time that predates some visitor activities at the entry. For example, the image may include a picture of the visitor that was taken just before the visitor actuated a doorbell or while the visitor was approaching the entry.

A visitor's presence may be identified using a variety of detection methods, individually or in some combination. For example, any one of motion detection, facial recognition, light contrast analysis, voice recognition, and image analysis may be used to determine that an object at the entry to the building or property is a person. In some cases, the exact person may be identified.

In one embodiment, a method for visitor detection using security and/or automation systems includes detecting an event at a doorway, capturing an image at the doorway associated with the event, capturing a video at the doorway associated with the event, delivering the image with a notice of the event to a recipient for viewing, and automatically uploading the video for viewing upon capturing the video. The video is available for selective viewing by the recipient upon being uploaded.

In one example, detecting the event may include detecting presence of a person at the doorway. Detecting presence of a person may include at least one of detecting motion, conducting facial recognition, conducting light contrast analysis, conducting voice recognition, and conducting special analysis. Detecting the event may include detecting operation of a doorbell. Capturing an image may include capturing a image frame from a video spanning a time period that occurs prior to the event. Capturing an image may include capturing an image frame from a video captured after the event. The video may span a time that precedes the detected event. The video may be uploaded concurrently with delivering the notice. Delivering the image may include delivering the image to a mobile computing device. Delivering the image may include delivering the image to a control panel of the security and/or automation system.

Another embodiment is directed to an apparatus for visitor detection using security and/or automation systems. The apparatus includes a processor, memory in electronic communication with the processor, and instructions stored in the memory, wherein the instructions are executable by the processor to detect a person at a doorway, capture a video at the doorway that includes the person, capture an image at the doorway that includes the person, deliver the image with a notice of the person at the doorway to a recipient for viewing, the notice including a link to the video, and automatically upload the video for viewing upon capturing the video. The video is available for selective viewing by the recipient upon being uploaded.

In one example, the instructions may be executable by the processor to detect the person at the doorway using at least one of motion detection, facial recognition, light contrast analysis, voice recognition, and actuation of a doorbell. The instructions may be executable by the processor to receive a communication from the recipient in response to the notice, and present the communication to the person. The instructions may be executable by the processor to receive instructions from the recipient, and operate a barrier to grant access to the person based on the instructions. The instructions may be executable by the processor to capture the video prior to and after detecting the person. The instructions may be executable by the processor to capture the image from the video.

A further embodiment is directed to a non-transitory computer-readable medium storing computer-executable code for visitor detection using security and/or automation systems. The code is executable by a processor to continuously record video of an entry to a building, detect an event at the entry, and transmit a portion of the video to a recipient for viewing in response to the detected event, wherein the portion of the video includes at least a time period prior to the event.

In one example, the code may be executable by the processor to delete the video after a predetermined time has elapsed without occurrence of the event. The code may be executable by the processor to obtain an image of the entry, and transmit the image to the recipient for viewing. The event may include actuation of a doorbell.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
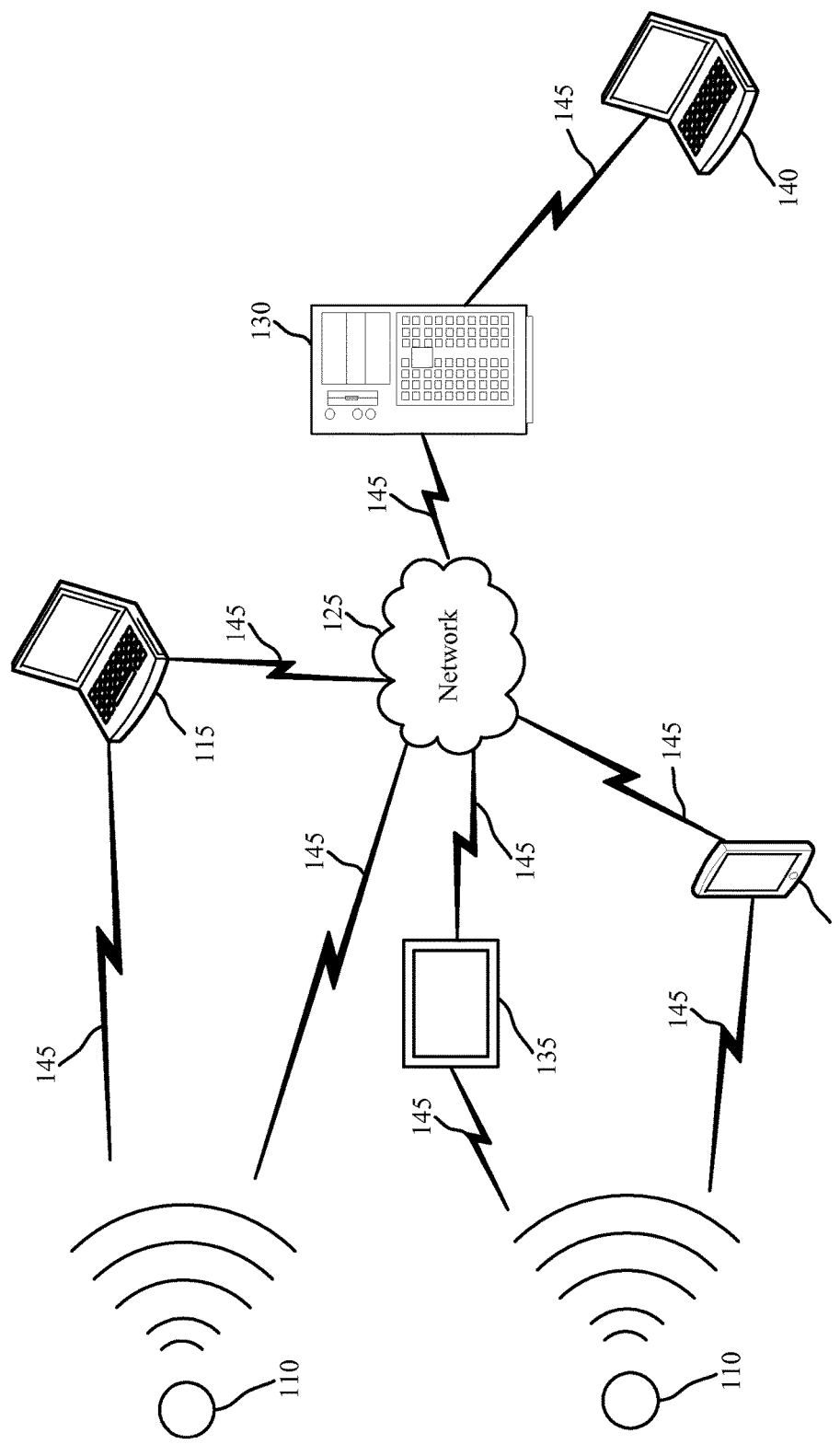
FIG. 1 is a block diagram of an example of a security and/or automation system in accordance with various embodiments.

The present disclosure addresses the shortcoming of prior art doorbell camera systems by capturing still images and/or video in association with a doorbell operation event. The still images and/or video may be captured prior to the doorbell operation event. In one embodiment, the doorbell camera continuously captures video and overwrites the recorded video after a delay period if no doorbell operation occurs. In the event a visitor approached the doorway and operates the doorbell, the system may identify still images and/or videos from the time period before the doorbell operation and sends those images/video to the homeowner's computing device (e.g., app operating on the homeowner's smart phone or a control panel). In other embodiments, the capturing of images and video is initiated before the doorbell actuation based on other methods such as motion detection, facial recognition, algorithms for light and contrast, voice recognition, and spatial detection, alone or in combination with other considerations such as time of day, field of view, and the like.

Using images captured before the doorbell operation can address the problem of the camera being covered by the visitor's hand or other body part at the time the image is captured. The timing used for capturing the image may be optimized such that the visitor is close enough to the camera to be able to identify the visitor's face, but not so close that the image is distorted or filled by other body parts such as hands, arms, etc. The camera's field of view may also be optimized to capture the visitor's face as the visitor approached the doorway, waits at the doorway, and/or interacts with the doorbell. Facial recognition software may be used to assist in distinguishing between a person approaching the doorway and other types of movement that may be detected and/or recorded (e.g., movement of trees in the background or debris blown into the doorway). In some embodiments, the facial recognition may be used to identify specific visitors.

Using the video captured before the doorbell actuation may address the issue of delays in later view of the video by the homeowner due to buffering because the buffering (which is occurring continuously on the ongoing captured video stream) may already be completed or at least partially completed before the video is even sent to and/or opened for viewing by the homeowner.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

FIG. 1 is an example of a communications system 100 in accordance with various aspects of the disclosure. In some embodiments, the communications system 100 may include one or more sensor units 110, local computing device 115, 120, network 125, server 130, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to detection of a visitor at an entry point to a building or property. Each sensor unit 110 may be capable of sensing multiple detection parameters, or alternatively, separate sensor units 110 may monitor separate detection parameters. For example, one sensor unit 110 may operate to detect motion, while another sensor unit 110 (or, in some embodiments, the same sensor unit 110) may detect facial features or other physical characteristics that distinguish the visitor from other objects at the entry. In some embodiments, one or more sensor units 110 may additionally monitor alternate detection parameters, such as light or color contrast, temperature of the detected object (e.g., via infrared sensing), a sensed electronic signal (e.g., a radio frequency identification (RFID) or near field communication (NFC) signal), or actuation of a communication device such as a doorbell, intercom, camera, keypad, or the like. In some embodiments, a user may input detection data directly at the local computing device 115, 120 or at remote computing device 140. For example, a user may enter data into a dedicated application on his smart phone indicating arrival at an entry to a building or property.

Data gathered by the one or more sensor units 110 may be communicated to local computing device 115, 120, which may be, in some embodiments, a thermostat or other wall-mounted input/output smart home display, such as an entry device for a building or property (e.g., a doorbell device or communications system interface). In other embodiments, local computing device 115, 120 may be a personal computer or smart phone. Where local computing device 115, 120 is a smart phone, the smart phone may have a dedicated application directed to collecting visitor detection data and/or responding to notices related to detected visitors. The local computing device 115, 120 may process the data received from the one or more sensor units 110 to obtain confirmation of the detected visitor. In alternate embodiments, remote computing device 140 may process the data received from the one or more sensor units 110, via network 125 and server 130, to obtain confirmation of the detected visitor. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120. In some embodiments, The server 130 may be configured to communicate with the sensor units 110, the local computing devices 115, 120, the remote computing device 140 and control panel 135. The server 130 may perform additional processing on signals received from the sensor units 110 or local computing devices 115, 120, or may simply forward the received information to the remote computing device 140 and control panel 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of visitor detection related data from a sensor unit 110, a stream of detection data from the same or a different sensor unit 110, and a stream of detection data from either the same or yet another sensor unit 110. The data streams may include images, video and/or particular sensor data such as motion sensor data. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing detection data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with resource usage data.

The communications system 100 may operate to detect that a visitor has arrived at an entry to a building or property, or determine that a visitor event has occurred via, for example, operation of sensors 110. The communications system 100 may transmit information to control panel 135 and/or directly to one of local computing devices 115, 120. In some embodiments, control panel 135 may notify the local computing devices 115, 120 or remote computing device 140 related to the detected visitor and/or visitor event. The notification or notice delivered to control panel 135 and/or computing devices 115, 120, 140 may include an image of the visitor (e.g., a jpeg image). The image may be visible to one or more users without opening the notification and/or unlocking the computing device. The user may be able to respond to the notification promptly (e.g., by sending a message to the visitor, such as an audio or visual message, or opening an access point to the building or property).

The communications system 100 may provide for delivery of a video clip associated with the visitor or visitor event to one or more of the control panel 135 and computing devices 115, 120, 140. The video clip may be accessible after the user views the image associated with the notification described above. The video may be buffered or otherwise prepared for viewing by the user at one or more of the control panel 135 and computing devices 115, 120, 140 concurrently with delivery of the notice and viewing of the image by the user. The video clip may provide additional details related to the visitor and/or the visitor event.

The buffering of the video prior to opening the notification may provide improved timing associated with being able to view the video clip. If the user can immediately view the video upon receipt of the notification, there may be reduced incidence of the visitor having to wait extended amounts of time prior to obtaining a response from the user, which may otherwise lead the visitor to leave before getting a response.

In some embodiments, the image that is sent with the notification may be collected before the visitor event (e.g., actuation of a doorbell). In at least some examples, communications system 100 may collect images before the visitor event (e.g., a continuously operating video camera) and the image is selected based on a predetermined step back in time once the visitor event has occurred. For example, the predetermined amount of time may be in the range of 0.5 seconds to about 2 seconds prior to the visitor event, which may capture an image of the visitor at a point in time leading up to the visitor event (e.g., actuating a doorbell, intercom button, door knock, or the like). The video clip may also cover a period of time prior to the visitor event. The video clip may begin to be buffered prior to the visitor event due to a continuously ongoing buffering process for ongoing captured video.

In other examples, the collection of images and/or video may be initiated based on detecting a visitor well in advance of the visitor performing an action such as actuating a doorbell (e.g., a visitor event). For example, the communications system 100 may identify a visitor approaching an entry to a building or property, which prompts initiation of video recording and/or taking pictures in an area of the entry.

Communications system 100 may use various methods to capture an image of the visitor's face or other recognizable body parts, or simply identify an object as a visitor. For example, communications system 100 may use facial recognition, light contrast, voice recognition, and the like, alone or in combination with motion detection, to confirm that an object in the area of the entry to the building or property is a person as opposed to other types of objects, such as animals, debris or objects moving in a background view (e.g., blowing trees). A camera or other sensor represented by sensor 110 in FIG. 1 may be set up and arranged in such a way to maximize the possibility of capturing the visitor's face or other recognizable body party as part of capturing images and/or video footage of the visitor and/or visitor event.

The processing associated with determining the presence of a visitor and/or a visitor event (e.g., data received from sensors 110) may be performed by any one of control panel 135 and computing devices 115, 120, 140. At least some of the data and other information associated with detecting a visitor and/or a visitor event, and the communications between a user of a building or property and a visitor, and the like may be stored on server 130 and/or any one of the control panel 135 and computing devices 115, 120, 140.

Figure 2:
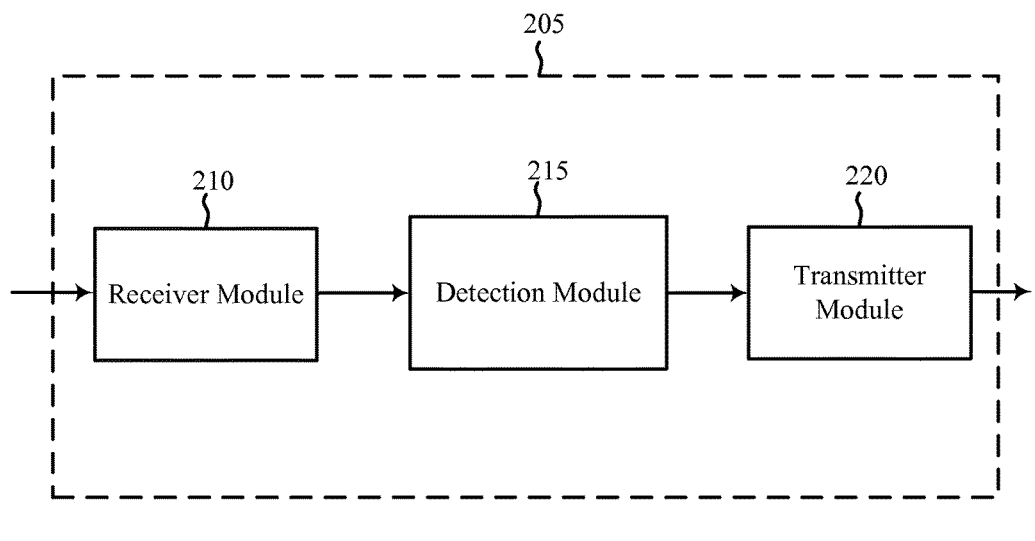
FIG. 2 shows a block diagram of a device relating to visitor detection using a security and/or an automation system, in accordance with various aspects of this disclosure.

FIG. 2 shows a block diagram 200 of a device 205 for use in electronic communication, in accordance with various aspects of this disclosure. The device 205 may be an example of one or more aspects of the control panel 135 described with reference to FIG. 1. In other embodiments, the device 205 may be an example of one or more aspects of the local computing devices 115, 120 described with reference to FIG. 1, or a particular apparatus such as a doorbell apparatus or system located at an entry to a building or property. The device 205 may include a receiver module 210, a detection module 215, and/or a transmitter module 220. The device 205 may also be or include a processor. Each of these modules may be in communication with each other—directly and/or indirectly.

The components of the device 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive detection related data from, for example, sensors 110 shown in FIG. 1. The receiver module 210 may be configured to receive other information such as responsive communications from one or more users who receive a notice related to the visitor or visitor event. Information may be passed on to the detection module 215, and to other components of the device 205.

The detection module 215 may operate to provide various functions related to, for example, detecting the presence of a visitor at a building or property, communication with a user of the building or property (e.g., a homeowner or property manager) related to detection of the visitor or a visitor event, facilitating communications between the user and the visitor, and/or providing access to a building or property based on the detected visitor, visitor event, or instructions provided by the user. The detection module 215 may conduct visitor detection using any of a variety of technologies, methods, equipment, and the like. In one example, detection module 215 receives data from a video motion detector and a facial recognition detector. In other embodiments, detection module 215 may receive data associated with a visitor event such as actuating a doorbell, intercom button, keypad, door knock, touch screen, or the like. In yet further examples, detection module 215 may receive data associated with a light contrast device or sensor, infrared sensor, or device that detects electronic signals such as a radio frequency identification (RFID) signal or geo-location signal.

Detection module 215 may generate a notice that is delivered to one or more users of the building or property in response to a detected visitor or visitor event. The notice may include a picture of the visitor or other objects, along with other information. The notice may include a video clip or link to a video of the detected visitor or visitor event. The image associated with the notice may provide the user with the ability to understand who the visitor is before accepting the notice, opening the notice, or in some way accessing the video clip. The video clip may be buffered or otherwise be prepared for viewing while the notice is being generated and sent to the user. In other examples, the video clip is buffered after the notice is opened or the video clip is otherwise accessed. The picture itself may provide sufficient information for the user to act in response to the notice such as, for example, providing a responsive communication to the visitor, opening an access point (e.g., a door), turning on lighting, providing control of other electronic devices or generating further notices.

Detection module 215 may collect an image for delivery with the notice that is back in time before the visitor is detected and/or the visitor event occurs. In one example, device 205 may operate to generate a plurality of images such as by taking image frames from ongoing video captured of an entry to a building or property. Once the visitor is detected and/or a visitor event occurs (e.g., actuation of a doorbell), detection module 215 may go back in time and collect an image and/or video clip that ideally includes an image of the visitor's face or other recognizable feature. Using such back in time images and/or video may provide certain advantages including, for example, providing improved timing for capturing a image when the visitor is at a certain distance from the camera or within a viewing window of the camera. The timing may also provide for pre-buffering of the video prior to or during delivery of the notice to the user as compared to video footage that is collected after the visitor is detected and/or after the visitor event occurs when the timing is such that little buffering cannot be completed before the user requests viewing of the video.

In other embodiments, early image capture may be unnecessary if the visitor is identified at a time sufficiently far in advance of actuating the doorbell or reaching the entry point for the building or property. In one example, detection module 215 may detect a visitor when the visitor is 5 to 10 feet away from the entry point (e.g., front door). Detection module 215 may collect an image after a delay of detecting the visitor so that the visitor is within an ideal viewing window of the camera, or is sufficiently close to the camera to provide the desired image resolution. The collected image may be sent to the user prior to the visitor operating the doorbell or conducting other activities that may be considered a visitor event. Similarly, the video footage captured and sent to the user may also occur before the visitor event (e.g., operating a doorbell, intercom button, keypad, touch screen, or the like) so that the image and/or video selection is independent of the visitor event occurring.

The transmitter module 220 may transmit the one or more signals received from other components of the device 205. The transmitter module 220 may transmit detection related information such as, for example, motion sensor data, facial recognition data, voice recognition data, images, or video. In some examples, the transmitter module 220 may be collocated with the receiver module 210 in a transceiver module.

Figure 3:
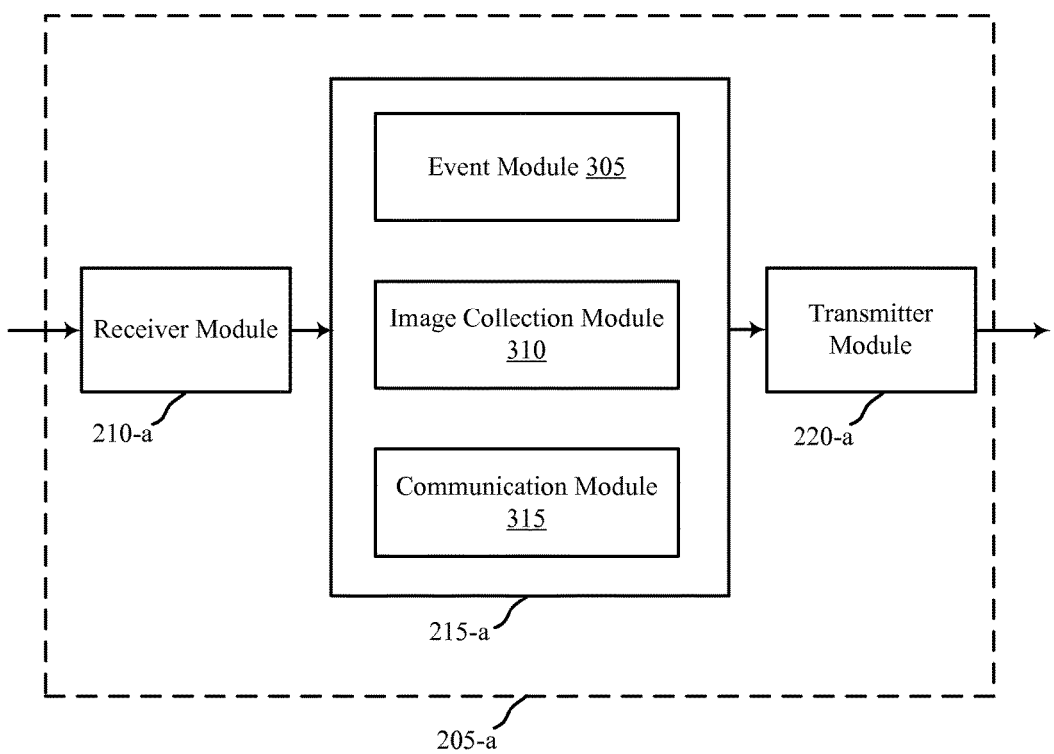
FIG. 3 shows a block diagram of a device relating to visitor detection using a security and/or an automation system, in accordance with various aspects of this disclosure.

FIG. 3 shows a block diagram 300 of a device 205-a for use in wireless communication, in accordance with various examples. The device 205-a may be an example of one or more aspects of a control panel 135 or local computing device 115, 120 described with reference to FIG. 1. It may also be an example of a device 205 described with reference to FIG. 2. The device 205-a may include a receiver module 210-a, a detection module 215-a, and/or a transmitter module 220-a, which may be examples of the corresponding modules of device 205. The device 205-a may also include a processor. Each of these components may be in communication with each other. The detection module 215-a may include an event module 305, an image collection module 310, and a communication module 315. The receiver module 210-a and the transmitter module 220-a may perform the functions of the receiver module 210 and the transmitter module 220, of FIG. 2, respectively.

The components of the device 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The event module 305 may operate to identify a visitor event. The visitor event may include, for example, operating a doorbell, keypad, intercom system, lighting, motion detection, touch screen, or the like. Event module 305 may determine that the visitor event has occurred based on data from one or more sensors, devices and/or systems. Event module 305 may, for example, generate notices, request further information, communicate with other modules of detection module 215-a, and perform other functions in response to received data.

Event module 305 may utilize data associated with, for example, facial recognition, light contrast, infrared sensing, object temperatures, motion detectors, sonic sensors, voice recognition, and the like as part of identifying a visitor. Once a visitor is identified, event module 305 may communicate with other modules, such as image collection module 310, as part of collecting information about the visitor such as an image or video clip. Event module 305 may generate notices and/or other data related to the identified event.

Image collection module 310 may operate to collect one or more images related to a detected visitor, a visitor event, or area under observation by detection module 215-a. Image collection module 310 may include receiving a video stream from one or more cameras. The video content may be continuously buffered by image collection module 310. Image collection module 310 may store the collected images. The stored collected images may be automatically deleted after a predetermined time period, such as within a predetermined time unless a visitor event occurs, such as identifying presence of a visitor and/or operation of a doorbell.

Images and other data associated with one or more visitors as collected by image collection module 310 may be transmitted to another location for storage. The information may be associated with a notice such as a message that is delivered to one of control panel 135 and computing devices 115, 120, 140 shown in FIG. 1. The notice may include information regarding the visitor and/or a visitor event. The notice may include still shot images (e.g., jpep images) or video footage. The notice may include text messages, audio messages, and the like.

Communication module 315 may facilitate communications such as the notices described above with reference to event module 305 and image collection module 310. Communication module 315 may generate and/or transmit notices related to a detected visitor and/or visitor event. Communication module 315 may also operate to receive communications from other sources such as, for example, one or more of the control panel 135 and computing devices 115, 120, 140 shown in FIG. 1. The received communications may include instructions for operating some aspect of communications system 100 of FIG. 1 and/or device 205 of FIGS. 2 & 3. Communication module 315 may receive information from another computing devices such as, for example, an audio message, text message, images, or the like. The information may be displayed for the visitor or in some other way communicated to the visitor.

The received information may include instructions for operating a device of the building or property. For example, the communication may include instructions for unlocking a bather such as a front door of the building. In other examples, the communication may include instructions for operating lighting, operating a camera, operating a display screen, entering a security code, or the like. Communication module 315 may be in communication with, for example, network 125 for facilitating communications between device 205-a and any one of control panel 135 and computing devices 115, 120, 140.

Figure 4:
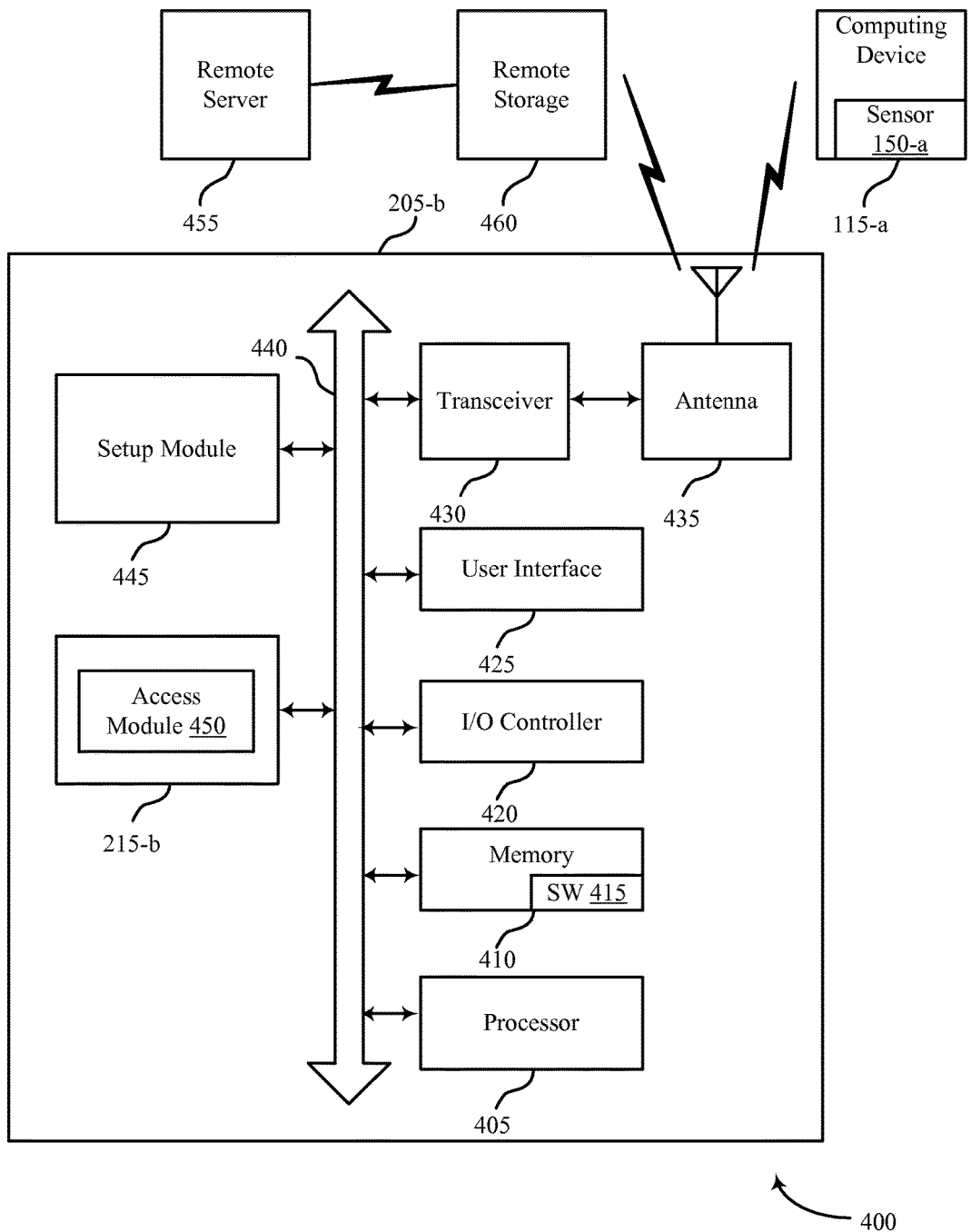
FIG. 4 shows a block diagram relating to visitor detection using a security and/or an automation system, in accordance with various aspects of this disclosure.

FIG. 4 shows a system 400 for visitor detection using security and/or automation systems, in accordance with various examples. System 400 may include a device 205-b, which may be an example of the control panels 105 of FIG. 1. Device 205-b may also be an example of one or more aspects of devices 205 and/or 205-a of FIGS. 2 and 3.

Device 205-b may include setup module 445, which may include at least some of the same feature or functions of the detection module 215 described with reference to FIGS. 2-3. Device 205-b may also include access module 450, which may be part of detection module 215-b. Detection module 215-b may be an example of detection module 215 described with reference to FIGS. 2-3.

Device 205-b may also include components for bi-directional voice and data communications including components for transmitting communications and components for receiving communications. For example, device 205-b may communicate bi-directionally with one or more of computing device 115-a, one or more sensors 150-a, remote storage 460, and/or remote server 455 which may be an example of the remote server of FIG. 1. This bi-directional communication may be direct (e.g., device 205-b communicating directly with remote storage 460) or indirect (e.g., device 205-b communicating indirectly with remote server 455 through remote storage 460).

The setup module 445 may be particularly useful in setting up operation of device 205-b for detecting a visitor and/or visitor event. For example, setup module 445 may include one or more settings that are preset for standard sized entryways of a building or property. Setup module 445 may provide options for adjusting sensitivity of certain sensors, cameras, lighting, and the like to optimize detection of a visitor and/or visitor event. In one example, setup module 445 may provide adjustment of a field of view for one or more cameras used to detect a visitor. The field of view may be widened or narrowed, or adjusted up, down or side-to-side depending on, for example, certain background features such as vegetation, supporting structures of the building, and the like that may influence the ability to accurately capture an image of the visitor's face or other recognizable features. Setup module 445 may provide a digital zoom for adjusting the field of view. Setup module 445 may provide adjustment of other features such as, for example, a sensitivity of a motion detector, parameters of a light contrast sensor, parameters of an infrared sensor, and the like. The setup module 445 may be adjusted based on, for example, a distance that the device 205-b is positioned relative to an access point (e.g., door) of the building or property, ambient lighting, background colors, and the like.

Setup module 445 may include a learning feature that automatically optimizes, for example, a field of view, sensor setting, or the like over time as data is collected for various visitors and/or visitor events. For example, setup module 445 may automatically adjust to various lighting conditions, weather conditions, time of day considerations, physical size of visitors, number of visitors present at a given time, the type of visitor event, and the like to collect the desired information that may be useful for detecting a visitor or visitor event, and/or providing other functions in response to a detected visitor or visitor event.

In one example, setup module 445 may be preset with a certain camera field of view in a given XY coordinate based on where a visitor's face should be seen relative to when a doorbell operation occurs. Setup module 445 may provide optimization of the field of view with different XY coordinates and/or zoomed state, or timing based on the doorbell actuation, to obtain the most desirable image of the visitor's face for a majority of the visitor events that occur.

Setup module 445 may also operate to use one or more of a variety of different inputs for detecting a visitor and/or visitor event. In some scenarios, a user may select only a single parameter for determining presence of a visitor and/or a detection of a visitor event. In other arrangements, the user may request two or more such parameters. The parameters may include, for example, how a visitor approaches (e.g., directional or distance), algorithms for contrast and light as part of spatial detection, a time parameter such as time of day, field of view, motion detection, and the like.

The access module 450 may be part of the detection module 215-*b*. In some examples, setup module 445 may also be part of detection module 215-*b*. Access module 450 may operate independent of detection module 215-*b* and/or setup module 445. The access module 450 may facilitate access to a building or property in response to, for example, a detected visitor and/or visitor event. In one embodiment, a user may provide instructions for unlocking a door and/or opening a door in response to a notice about a visitor and/or visitor event. The user may provide instructions via, for example, one or more of control panel 135 and computing devices 115, 120, 140 shown in FIG. 1. The instructions may include operation of a door lock and/or opening of a door. Access module 450 may operate the door lock and/or door opening mechanism. Access module 450 may provide other operations, such as, for example, opening or closing windows, operating an elevator, or operating a security feature such as, for example, disarming a security system in order to permit the visitor to access the building or property without triggering an alarm.

The access module 450 may provide instructions to a user and/or visitor as part of providing the desired access. For example, access module 450 may provide an audible or text message to the visitor instructing the visitor to operate a door handle, enter a security code, or the like to facilitate access.

Device 205-*b* may also include a processor module 405, and memory 410 (including software/firmware code (SW) 415), an input/output controller module 420, a user interface module 425, a transceiver module 430, and one or more antennas 435 each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of computing device 115-*a*, remote storage 460, and/or remote server 455. The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of device 205-*b* (e.g., one or more antennas 435, transceiver module 430, etc.) may provide a direct connection to a remote server 455 via a direct network link to the Internet via a POP (point of presence). In some embodiments, one element of device 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of device 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., detect one or more visitors, communicate notices related to the visitor, provide images and/or video related to the visitor, provide setup of a detection system, provide access to a building or other property based on a detected visitor, etc.). Alternatively, the software/firmware code 415 may not be directly executable by the processor module 405, but may cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the setup module 445, access module 450, and/or detection module 215-*b* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the computing devices 115-*a* may include a single antenna 435, the computing devices 115-*a* may have multiple antennas 435 capable of concurrently transmitting and/or receiving multiple wireless transmissions.

The device 205-*b* may include a detection module 215-*b*, which may perform the functions described above for the detection modules 215 of device 205 of FIGS. 2 and 3.

Figure 5:
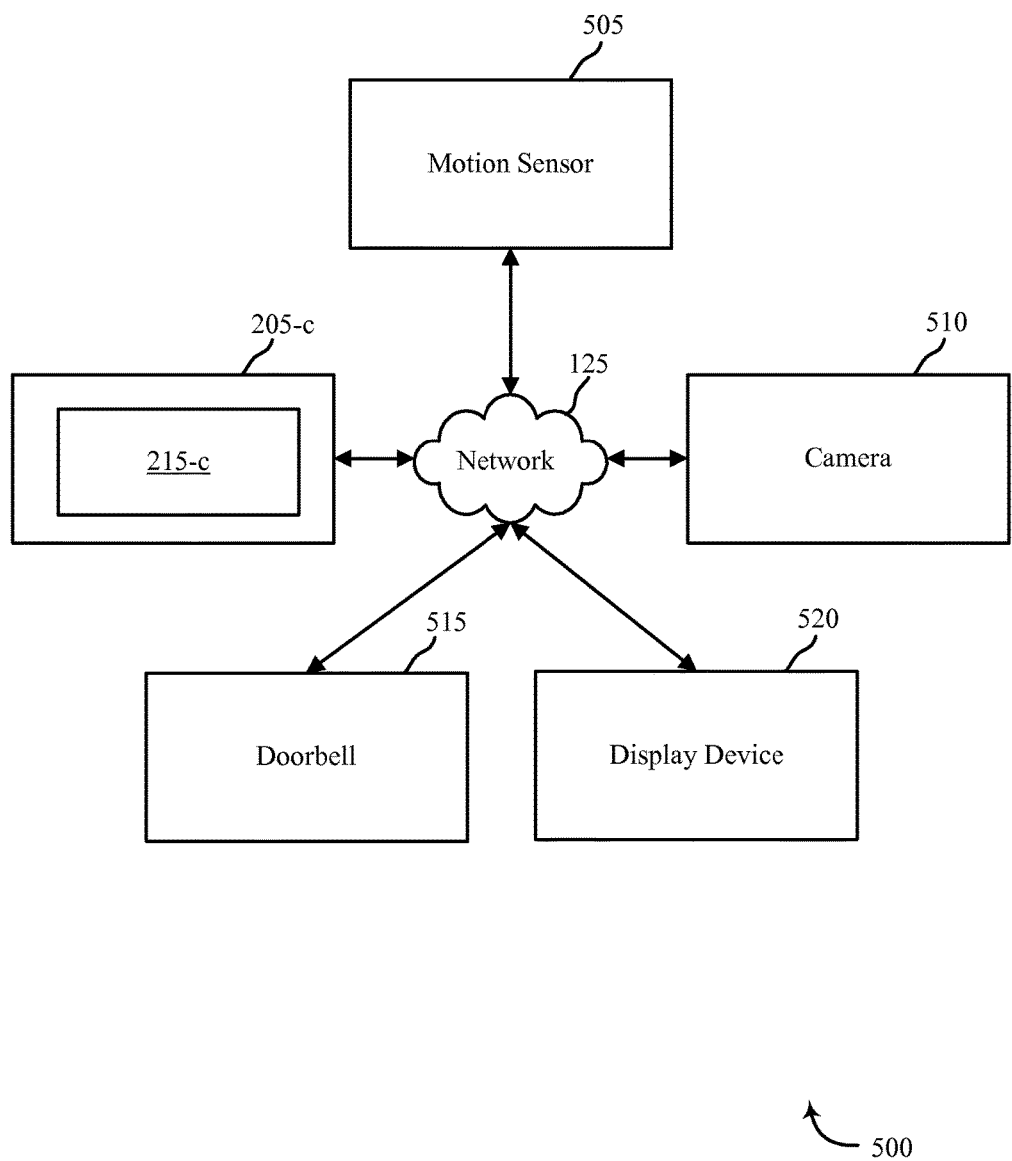
FIG. 5 shows a block diagram of an apparatus relating to visitor detection using a security and/or an automation system, in accordance with various aspects of this disclosure.

FIG. 5 shows a block diagram of a system 500 for visitor detection. The system 500 may be part of a security and/or automation system, and/or operating in conjunction with an automation and/or security system. Device 205-*c* may be an example of device 205 described above with reference to FIGS. 2-4. Detection module 215-*c* may be an example of the detection module 215 described with reference to FIGS. 2-4.

System 500 may include a device 205-*c* that operates a detection module 215-*c*. System 500 may also include at least one of a motion sensor 505, a camera 510, a doorbell 515, and a display device 520, which communicate with each other via network 125. Motion sensor 505 may be an example of the sensors 110 shown in FIG. 1. The camera 510 may be integrated into the doorbell 515, such as being housed in a common housing with doorbell 515 or other security and/or automation equipment located at an entry to a building or property. At least motion sensor 505, camera 510, and doorbell 515 may be positioned in proximity to an entry point to a building or property. In at least some examples, display device 520 may be positioned remote from the entry point, such as, for example, at an interior location of the building or property, or at a remote location relative to the building or property. Display device 520 may include, for example, a control panel of a security and/or automation system, or a mobile computing device carried by one or more users (e.g., a smart phone, tablet computing device, laptop, or the like).

Detection module 215-*c* may receive information from one or more of motion sensor 505, camera 510, and doorbell 515 as part of detecting or determining presence of a visitor at the entry. The motion sensor 505 may detect motion associated with a visitor approaching and/or positioned at the entry of the building or property. Detection module 215-*c* may determine presence of a visitor based on the data from motion sensor 505 alone. In other examples, camera 510 may provide additional information such as, for example, facial recognition data, light contrast data, voice recognition data, or the like that is used by detection module 215-*c*, alone or in combination with the data received for motion sensor 505, to determine presence of one or more visitors. Detection module 215-*c* may send a notice to one or more users via, for example, display device 520, informing the user about the detected visitor based on information received from one or more of motion sensor 505 and camera 510.

A visitor may operate doorbell 515, which may be recognized as a visitor event. Detection module 215-*c* may determine presence of the visitor based at least in part on operation of doorbell 515. Operation of doorbell 515 may be used in combination with data received from one or both of motion sensor 505 and camera 510 as part of determining presence of a visitor at the entry point.

Detection module 215-*c* may generate a notice of the detected visitor and/or visitor event. An image received from camera 510 may be associated with the notice. The image may include one or more visitors. The image may be from a time that is before operation of the doorbell 515 or at the time of or delayed from when the visitor is detected. The notice may include a video clip received from camera 510. The video clip may be accessible upon opening or otherwise accessing the notice via, for example, display device 520. As described above, the image associated with the notice may act as a placeholder that provides an immediate indication to the user of the detected visitor and/or visitor event in advance of accessing the video clip. The video clip may continue buffering prior to, during, and/or after the notice is sent to the user. The buffering may occur while the user views the image and contemplates how to respond to the image and/or whether or not to access the video clip.

The user may respond to the notice via display device 520. In some examples, the user may provide instructions in response to the notice, wherein the instructions are communicated via display device 520. The display device 520 may include, for example, a microphone, speaker, camera, touch screen, or the like that facilitates generating an instruction and/or responsive communication to the notice. Detection module 215-*c* may operate to present the instructions and/or communication from the user to the visitor. Detection module 215-*c* may provide additional operations in response to the instructions and/or response received from the user. For example, detection module 215-*c* may transmit an audio or text message to the visitor such as instructions for accessing the building and/or property, a request for further information, instructions for standing in a particular location for capturing of an improved image and/or video, or the like.

Figure 6:
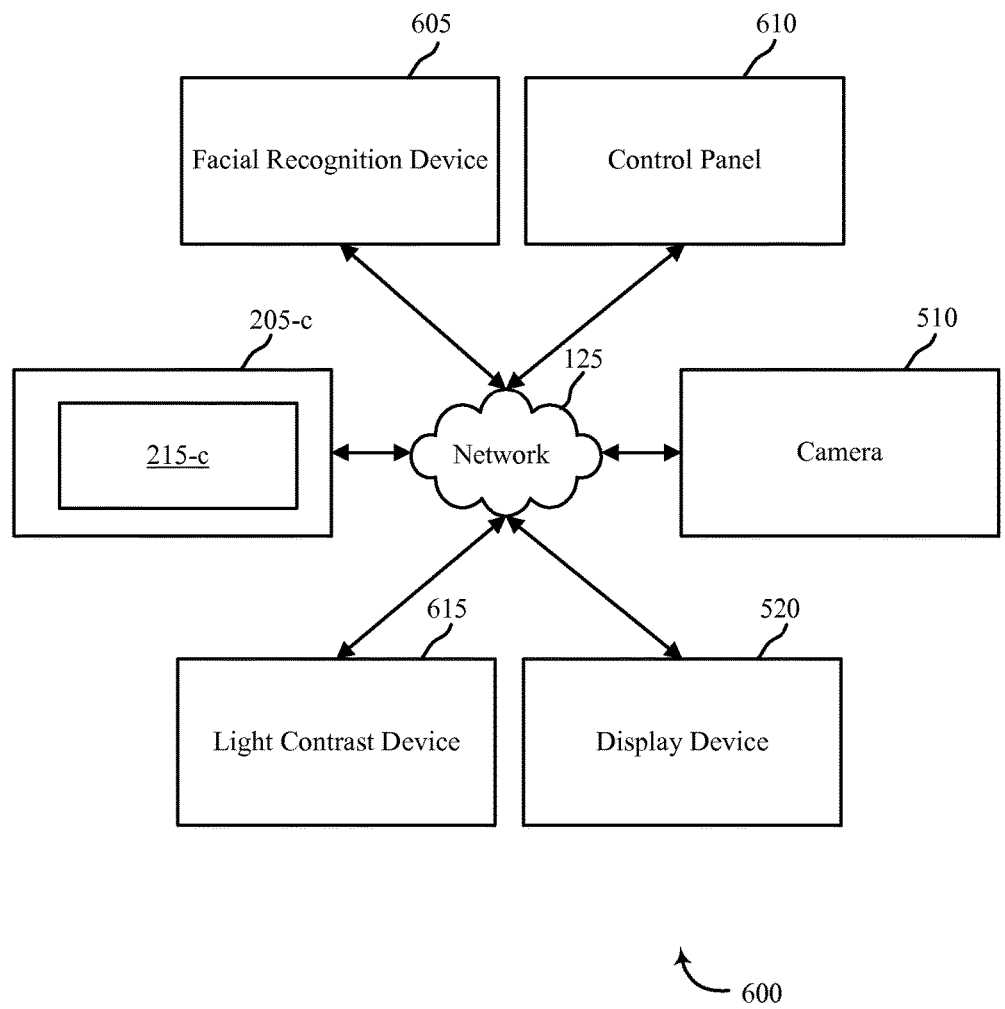
FIG. 6 shows a block diagram of an apparatus relating to visitor detection using a security and/or an automation system, in accordance with various aspects of this disclosure

FIG. 6 shows a block diagram of a system 600 relating to visitor detection. The system 600 may operate in conjunction with or be part of a security and/or automation system. System 600 includes a device 205-*c*, which may operate a detection module 215-c. Device 205-c may be an example of the device 205 described with reference to FIGS. 2-5. Detection module 215-c may be an example of detection module 215 described with reference to FIGS. 2-5.

System 600 may include, in addition to camera 510 and display device 520, a facial recognition device 605, a control panel 610, and a light contrast device 615, which communicate with each other via network 125. The facial recognition device 605 and light contrast device 615 may be used alone or in combination to facilitate detection of one or more visitors. In some examples, system 600 may additionally include a motion sensor and doorbell such as the motion sensor 505 and doorbell 515 described with reference to FIG. 5. System 600 may include any combination of sensors, devices and systems in order to facilitate detection of a visitor.

Device 205-c may receive data from one or more of facial recognition device 605, light contrast device 615, and camera 510 as part of detecting a visitor and/or visitor event. Device 205-c may transmit the collected data to control panel 610. Control panel 610 may provide at least some of the processing needed for operation of detection module 215-c and/or the detection of a visitor and/or visitor event. In some examples, control panel 610 provides display of data and/or a notice transmitted by detection module 215-c. In at least some examples, control panel 610 transmits data and/or information to other computing devices such as display device 520. Display device 520 may be a mobile computing device that is located on the premises of the building or property, or located remotely. As discussed above, display device 520 may be a handheld computing device such as a smart phone, a tablet computing device, laptop, or the like that a user can operate to receive notices related to a detected visitor and/or visitor event. A user may view the notice and/or respond to the notice and any associated images, video footage, instructions, and the like via one or both of control panel 610 and display device 520. In some examples, a user may provide communications or instructions to detection module 215-c via control panel 610 and/or display device 520. Detection module 215-c may facilitate communications to one or more visitors at an access point to a building or property.

Camera 510 may provide images and/or video that are used by facial recognition device 605 and/or light contrast device 615 as part of detecting one or more visitors. Facial recognition device 605 and/or light contrast device 615 may provide communications, instructions, or other controls for camera 510 to provide additional or improved data. In some examples, a feature such as setup module 445 described with reference to FIG. 4 may operate to control certain features of system 600 such as the facial recognition device 605, light contrast device 615, and/or camera 510 as part of optimizing detection of a visitor and/or visitor event.

System 600 may include additional or fewer features in other embodiments. Detection module 215-c may operate based in part on input from any number of different data sources, may respond to or provide communications with one or more visitors, and provide certain functionality such as instructions for providing access to a building or property based on the components of system 600.

Figure 7:
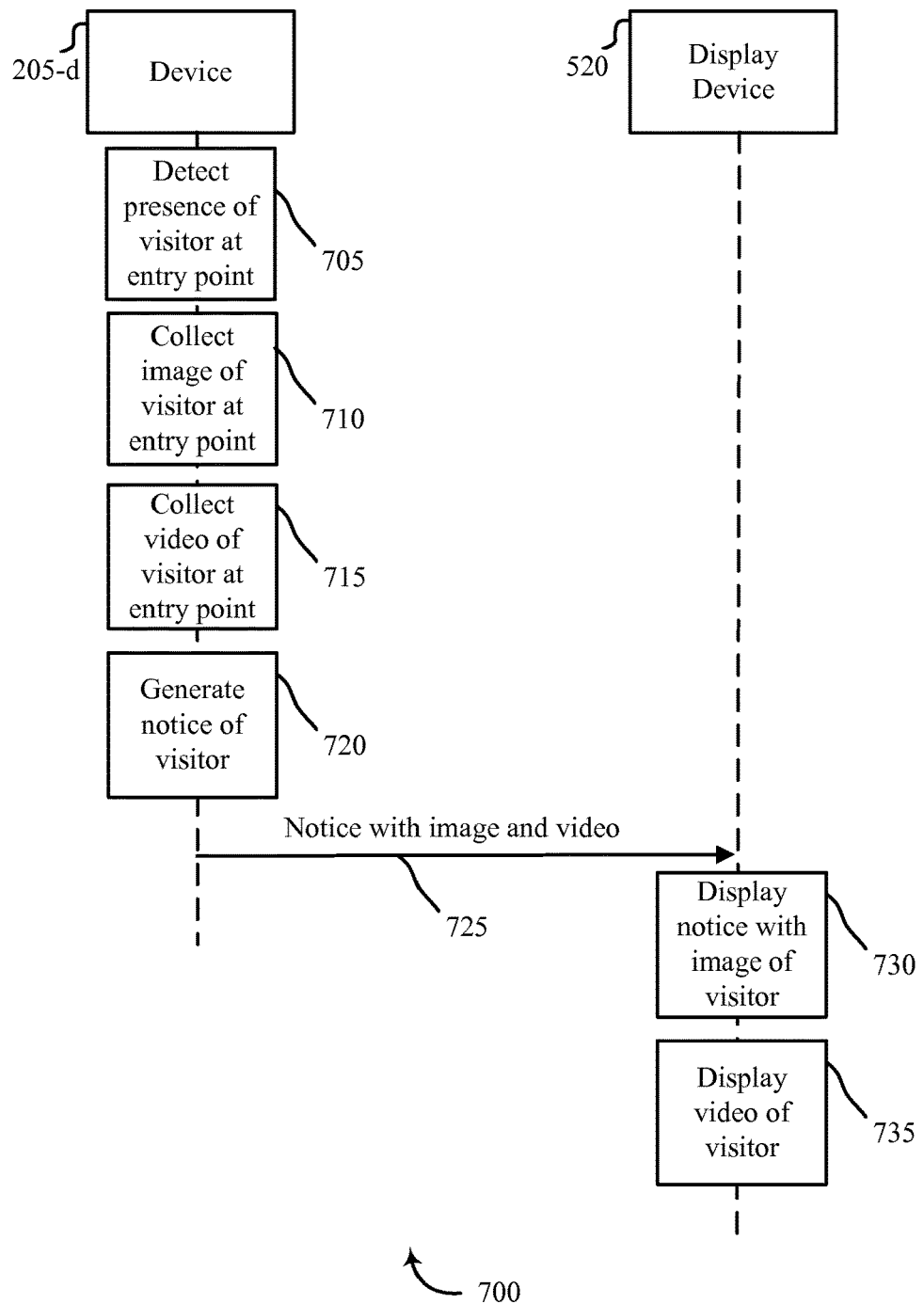
FIG. 7 shows a block diagram of an apparatus relating to visitor detection using a security and/or an automation system, in accordance with various aspects of this disclosure.

FIG. 7 shows a block diagram of a system 700 relating to visitor detection. System 700 includes a device 205-d and a display device 520. Device 205-d may be an example of a device 205 described above with reference to FIGS. 2-6. Display device 520 may be an example to display device 520 of FIG. 6, or the computing devices 115, 120, 140 or control panel 135 of FIG. 1.

Device 205-d may detect presence of a visitor at an entry point of a building or property at block 705. At block 710, device 205-d may collect one or more images of the visitor at the entry point. Device 205-d may collect video footage of the visitor at the entry point at block 715. The collected images at block 710 may be taken from the video collected at block 715. Device 205-d may generate a notice of the visitor and/or a visitor event at block 720. Device 205-d may operate a detection module such as the detection module 215 described with reference to FIGS. 1-6 as part of providing the functions of block 705, 710, 715, 720. Device 205-d may transmit a notice 725 that contains an image and the video (e.g., a link to the video). The notice 725 may be delivered to display device 520.

Display device 520 may display a notice with the image of the visitor at block 730. Display device 520 may also display the video of the visitor at block 735. The image displayed at block 730 may be visible prior to opening or otherwise accessing the notice. In at least some examples, the image may be displayed at block 730 without unlocking the display device 520. The video may be displayed at block 735 after the image is displayed at block 730. The video may be buffered from when the video is collected at block 715 until the video is displayed at block 735.

In other embodiments, the presence of the visitor at block 705 may be detected and/or confirmed after one or both of the collection of the image and collection of video at blocks 710 and 715. In some examples, separate notices are sent with the image and/or video.

Figure 8:
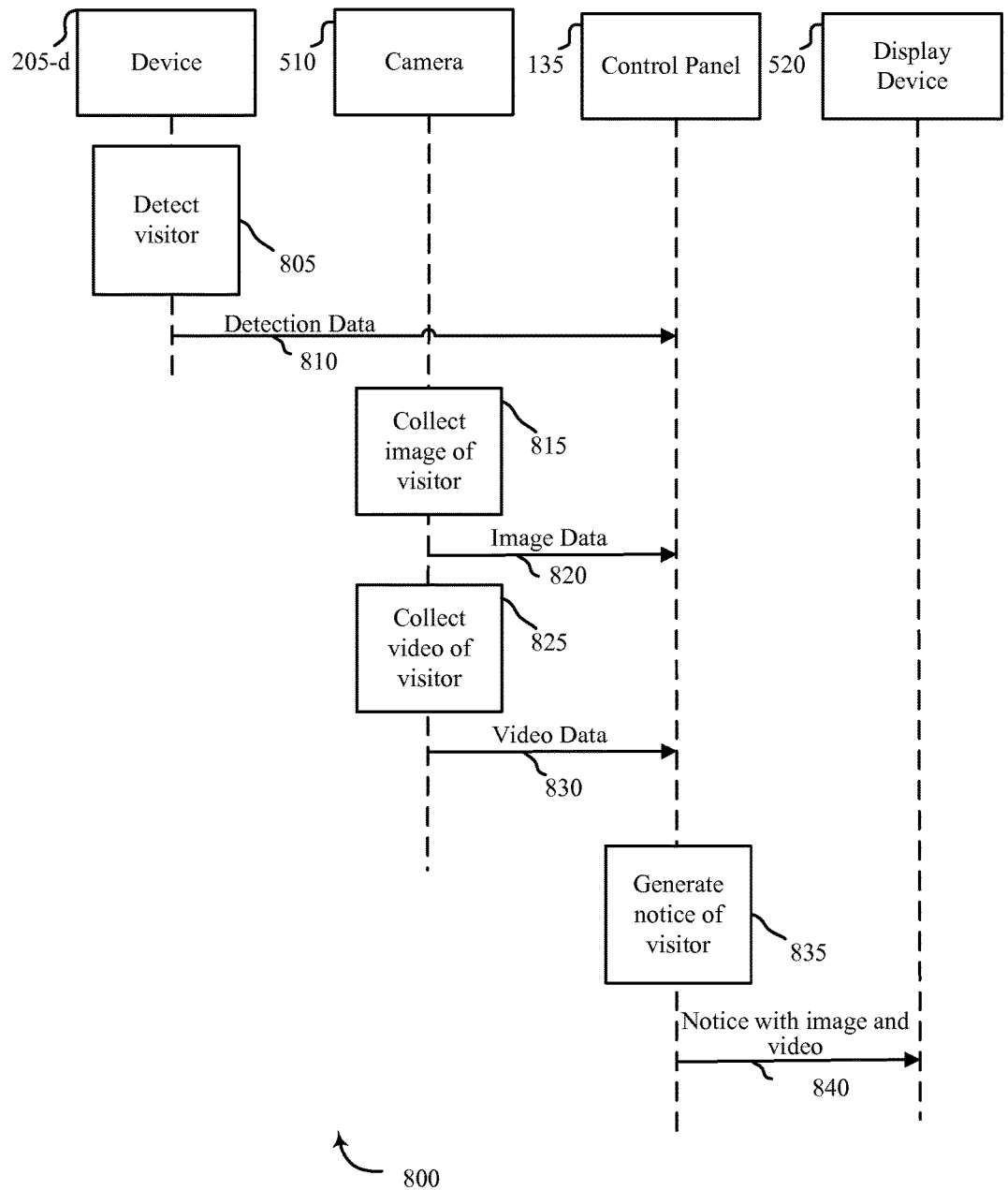
FIG. 8 shows a block diagram of an apparatus relating to visitor detection using a security and/or an automation system, in accordance with various aspects of this disclosure.

FIG. 8 is a block diagram showing an example system 800 for visitor detection. The system 800 may be used with or be part of a security and/or automation system. System 800 may include a device 205-d, camera 510, control panel 135, and display device 520. Device 205-d may be an example of device 205 described with reference to FIGS. 2-7. Camera 510 may be an example of a camera 510 described with reference to FIG. 5. Control panel 135 may be an example of control panel 135 described with reference to FIGS. 1 & 6. Display device 520 may be an example of a display device described with reference to FIGS. 5 & 6. In some examples, display device 520 is integrated into control panel 135.

System 800 may operate to communicate information about a detected visitor to one or more users such as homeowners or property managers for the building or property. Device 205-d may detect a visitor at block 805. The device 205-d may transmit detection data 810 to control panel 135. Camera 510 may collect one or more images of the detected visitor at block 815. Camera 510 may transmit image data 820 to control panel 135. Camera 510 may also collect video of the detected visitor at block 825. The video data 830 may be transmitted to control panel 135.

Control panel 135 may generate a notice of the visitor at block 835. Control panel 135 may transmit the notice 840 with the image and video to display device 520. One or more users may access the notice, image, and/or video at display device 520.

In some embodiments, a user may provide responsive instructions and/or information after viewing the notice, image, and/or video. Generating the notice of the visitor at block 835 may include attaching the image and/or video to the notice. In some embodiments, a separate notice with the image attached may be delivered to display device 520 separate from a notice with the video attached, which is sent to display device 520.

The collected image at block 815 may be obtained from the collected video at block 825. In at least some embodiments, the video may be collected at block 825 prior to collecting the image at block 815.

Detecting a visitor at block 805 may include a number of types of information such as, for example, motion detection data, facial recognition data, light contrast data, or the like, alone or in combination. In other examples, detecting a visitor at block 805 may occur in response to an action taken by a visitor such as, for example, operating a doorbell or other device at the entry to a building, which may be considered a visitor event.

Figure 9:
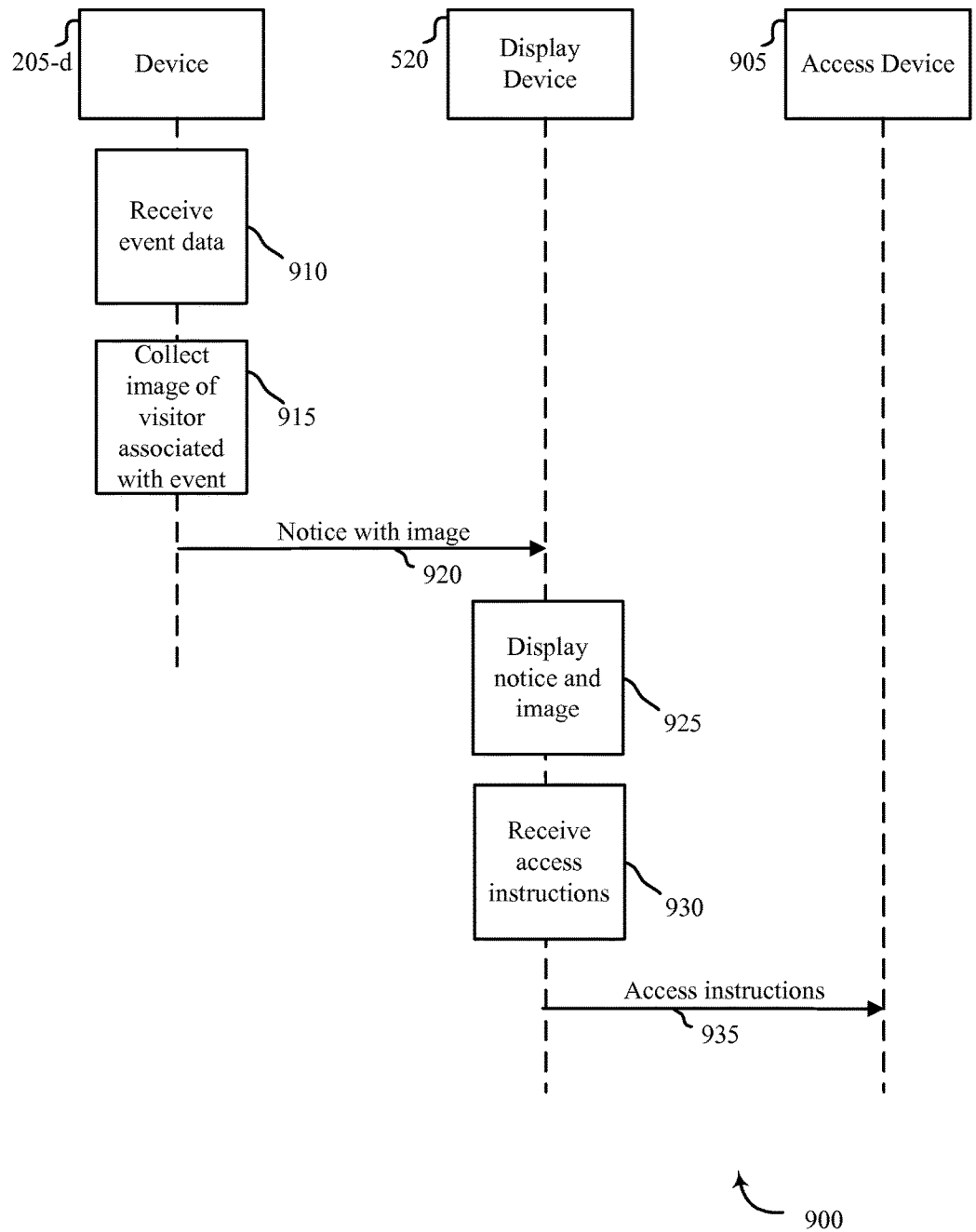
FIG. 9 shows a block diagram of an apparatus relating to visitor detection using a security and/or an automation system, in accordance with various aspects of this disclosure.

FIG. 9 is a block diagram of a system 900 for visitor detection. System 900 may operate with or by a security and/or automation system. System 900 may include a device 205-d, a display device 520, and an access device 905. Device 205-d may be an example of the device 205 described with reference to FIGS. 2-8. Display device 520 may be an example of the display device 520 described with reference to FIGS. 5-8. Access device 905 may cooperate with, for example, access module 450 described with reference to FIG. 4 as part of providing access to a building or property.

Device 205-d may operate to receive event data at block 910. Device 205-d may also collect one or more images of a visitor associated with the event at block 915. Device 205-d may transmit a notice 920 with the image to the display device 520.

Display device 520 may display a notice and the image at block 925. Display device 520 may also receive access instructions at block 930. The access instructions may be received from one or more users interfacing with display device 520. Display device 520 may transmit the access instructions 935 to access device 905. Access device 905 may provide, for example, access to a building or property via a barrier such as a door.

The event data at block 910 may include, for example, a visitor event such as operating a doorbell or other device, sensor, or the like at an entry to the building or property. The collected image at block 915 may be obtained from a camera. The camera may collect video and/or still shot images. In some examples, the still shot images are obtained from a continuous video collected by the camera. In some examples, the collection of the image may be triggered by identification of the event and/or receipt of the event data at block 910.

The notice 920 may include the image as a placeholder. The image may be viewable without opening the notice or otherwise accessing the notice. The access instructions 935 may include instructions for operating a door lock, a door handle, a door opening and/or closing device, a security code, or instructions for operating security feature associated with access device 905.

Figure 10:
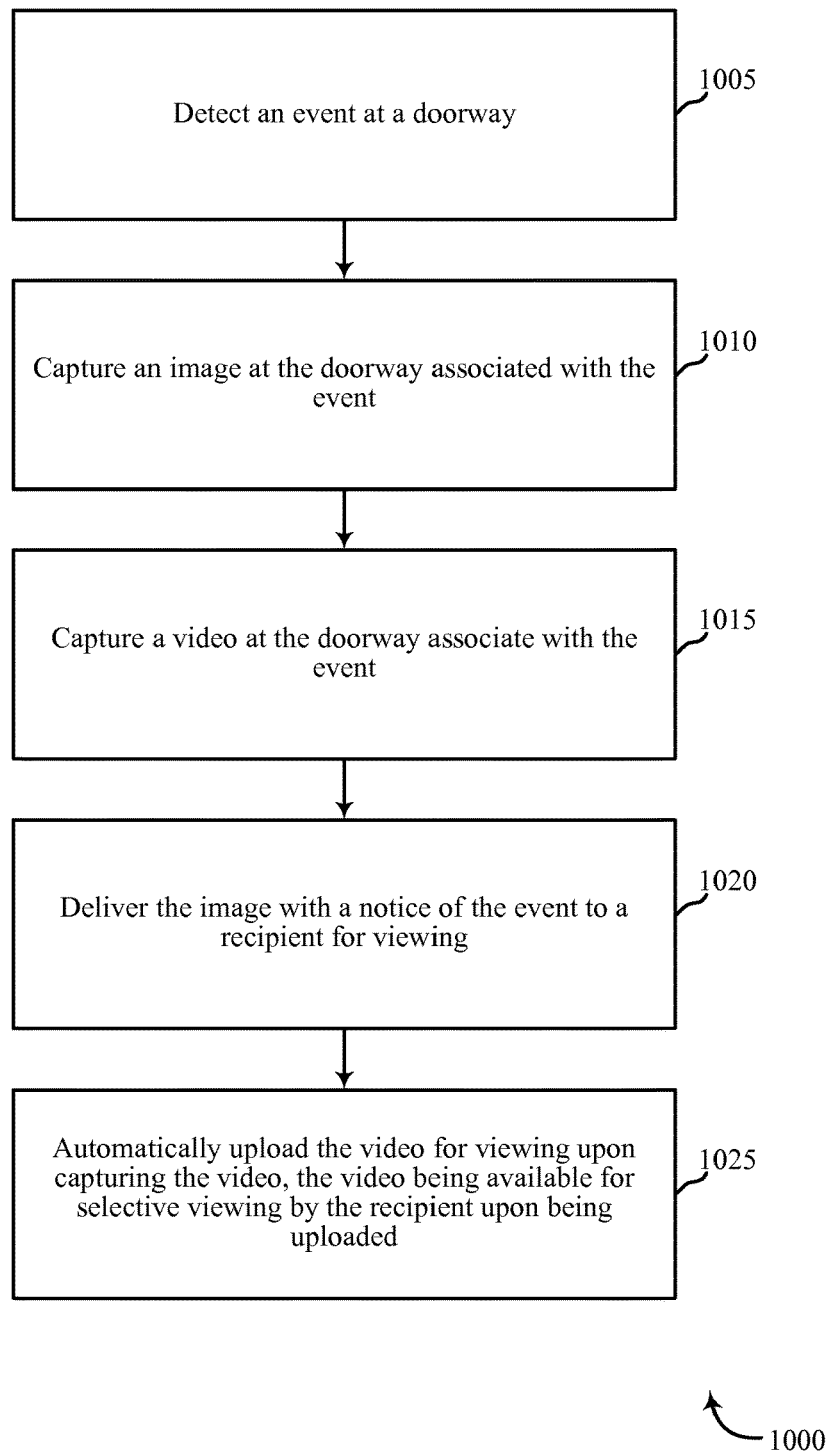
FIG. 10 is a flow chart illustrating an example of a method relating to visitor detection using a security and/or an automation system, in accordance with various aspects of this disclosure.

FIG. 10 is a flow chart illustrating an example of a method 1000 for detection of visitors at a building or property, and particular relatively early detection of such visitors, in accordance with various aspects of the present disclosure. For clarity, the method 1000 is described below with reference to aspects of one or more of the devices 205 described with reference to FIGS. 2-9, and/or aspects of one or more of the detection modules 215 described with reference to FIGS. 2-6. In some examples, control panel (e.g., control panel 135 shown in FIG. 1), a local computing device (e.g., local computing devices 115, 120 shown in FIG. 1), a sensor (e.g., sensor 110 shown in FIGS. 1 and 2), or any one of devices 205 described with references to FIGS. 2-9 may execute one or more sets of codes to control the functional elements of, for example, detection modules 215 described with reference to FIGS. 2-6 to perform the functions described below. Additionally or alternatively, the control panel (e.g., control panel 135 shown in FIG. 1), a local computing device (e.g., local computing devices 115, 120 shown in FIG. 1), a sensor (e.g., sensor 110 shown in FIGS. 1 and 2), or any one of devices 205 described with references to FIGS. 2-9 may perform one or more of the functions described below using special-purpose hardware or software.

At block 1005, the method 1000 includes detecting an event at a doorway. Block 1010 includes capturing an image of the doorway associated with the event. Block 1015 includes capturing a video at the doorway associated with the event. Block 1020 includes delivering the image with a notice of events to a recipient for viewing. Block 1025 includes automatically uploading the video for viewing upon capturing the video. The video may be available for selective viewing by the recipient upon being uploaded. In at least some examples, the video is delivered with the notice.

The operation(s) at blocks 1005, 1010, 1015, 1020, 1025 may be performed using the detection module 215 described with reference to FIGS. 2-6. The method 1000 may provide for detection of visitors and related functions using automation/security systems. It should be noted that the method 1000 is just one implementation and that the operations of the method 1000 may be rearranged or otherwise modified such that other implementations are possible.

Figure 11:
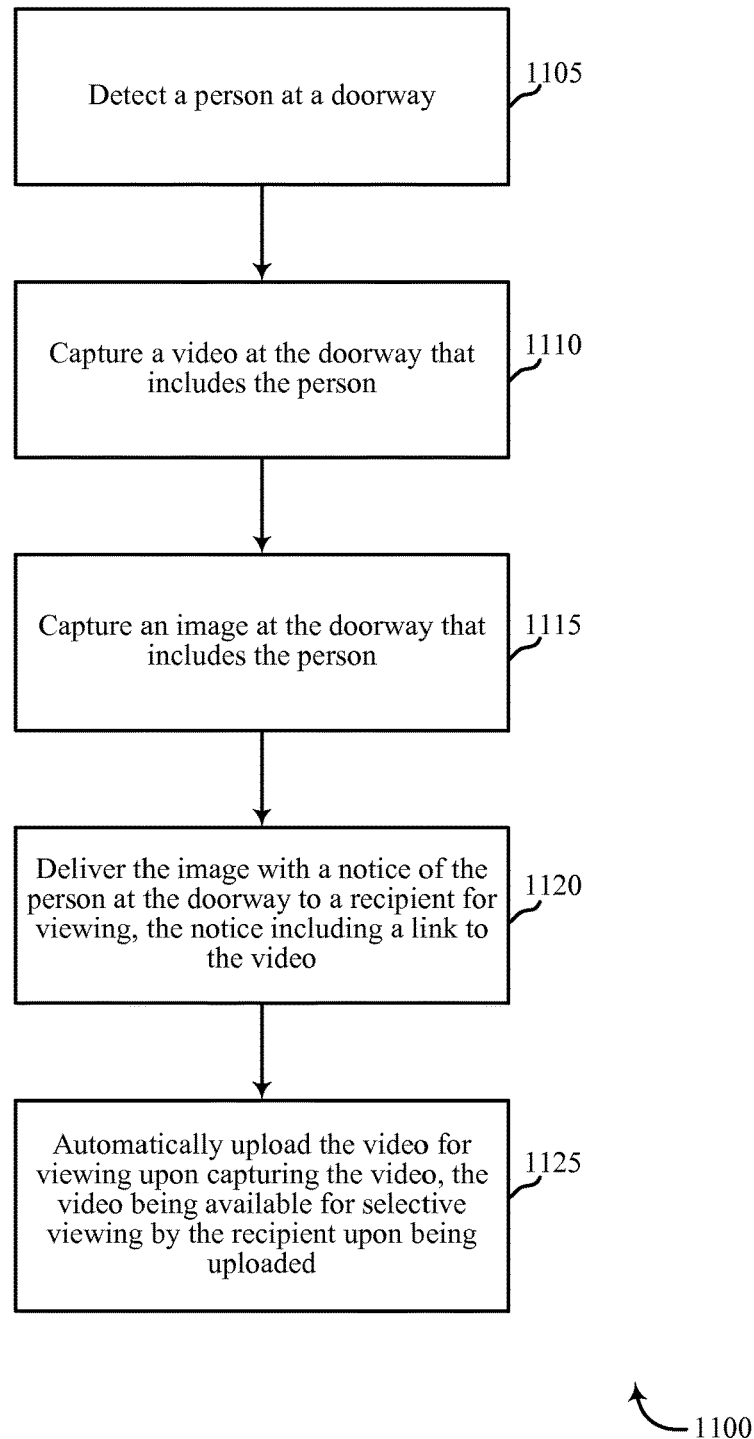
FIG. 11 is a flow chart illustrating an example of a method relating to visitor detection using a security and/or an automation system, in accordance with various aspects of this disclosure.

FIG. 11 is a flow chart illustrating an example of a method 1100 for detection of visitors at a building or property, and particular relatively early detection of such visitors, in accordance with various aspects of the present disclosure. For clarity, the method 1100 is described below with reference to aspects of one or more of the devices 205 described with reference to FIGS. 2-9, and/or aspects of one or more of the detection modules 215 described with reference to FIGS. 2-6. In some examples, control panel (e.g., control panel 135 shown in FIG. 1), a local computing device (e.g., local computing devices 115, 120 shown in FIG. 1), a sensor (e.g., sensor 110 shown in FIGS. 1 and 2), or any one of devices 205 described with references to FIGS. 2-9 may execute one or more sets of codes to control the functional elements of, for example, detection modules 215 described with reference to FIGS. 2-6 to perform the functions described below. Additionally or alternatively, the control panel (e.g., control panel 135 shown in FIG. 1), a local computing device (e.g., local computing devices 115, 120 shown in FIG. 1), a sensor (e.g., sensor 110 shown in FIGS. 1 and 2), or any one of devices 205 described with references to FIGS. 2-9 may perform one or more of the functions described below using special-purpose hardware or software.

At block 1105, the method 1100 includes detecting a person at a doorway. Block 1110 includes capturing a video of the doorway and that includes the person. Block 1115 includes capturing an image of the doorway that includes the person. Block 1120 includes delivering the image with a notice of the person at the doorway to a recipient for viewing, wherein the notice includes a video and/or a link to the video. Block 1125 includes automatically uploading the video for viewing upon capturing the video, wherein the video is available for selective viewing by the recipient upon being uploaded.

The operation(s) at blocks 1105, 1110, 1115, 1120, 1125 may be performed using the detection module 215 described with reference to FIGS. 2-6. The method 1100 may provide for detection of visitors and related functions using automation/security systems. It should be noted that the method 1100 is just one implementation and that the operations of the method 1100 may be rearranged or otherwise modified such that other implementations are possible.

Figure 12:
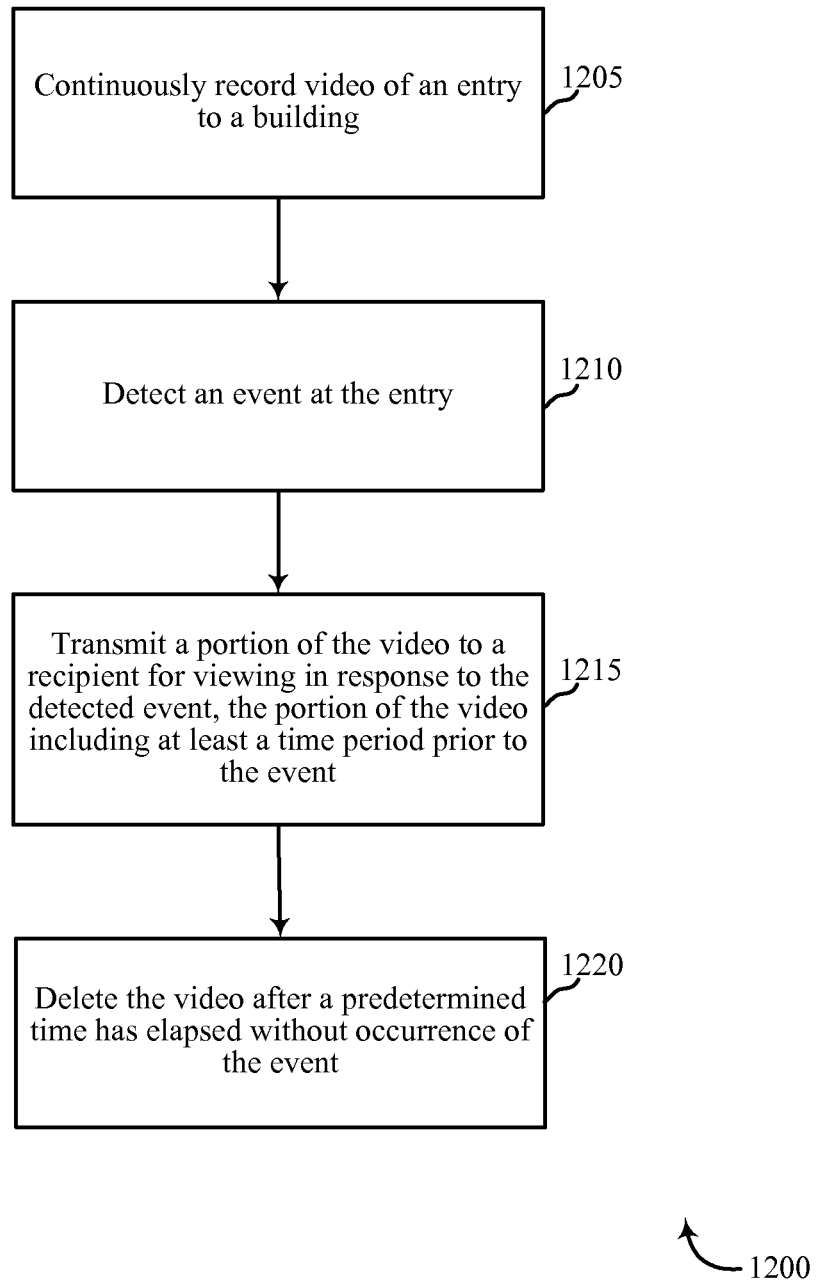
FIG. 12 is a flow chart illustrating an example of a method relating to visitor detection using a security and/or an automation system, in accordance with various aspects of this disclosure.

FIG. 12 is a flow chart illustrating an example of a method 1200 for detection of visitors at a building or property, and particular relatively early detection of such visitors, in accordance with various aspects of the present disclosure. For clarity, the method 1200 is described below with reference to aspects of one or more of the devices 205 described with reference to FIGS. 2-9, and/or aspects of one or more of the detection modules 215 described with reference to FIGS. 2-6. In some examples, control panel (e.g., control panel 135 shown in FIG. 1), a local computing device (e.g., local computing devices 115, 120 shown in FIG. 1), a sensor (e.g., sensor 110 shown in FIGS. 1 and 2), or any one of devices 205 described with references to FIGS. 2-9 may execute one or more sets of codes to control the functional elements of, for example, detection modules 215 described with reference to FIGS. 2-6 to perform the functions described below. Additionally or alternatively, the control panel (e.g., control panel 135 shown in FIG. 1), a local computing device (e.g., local computing devices 115, 120 shown in FIG. 1), a sensor (e.g., sensor 110 shown in FIGS. 1 and 2), or any one of devices 205 described with references to FIGS. 2-9 may perform one or more of the functions described below using special-purpose hardware or software.

At block 1205, the method 1200 includes continuously recording video of an entry to a building. Block 1210 includes detecting an event at the entry. Block 1215 includes transmitting a portion of the video to a recipient for viewing in response to the detected event, wherein the portion of the video includes at least a time period prior to the event. Block 1220 includes deleting the video after a predetermined time has elapsed without occurrence of the event.

The operation(s) at blocks 1205, 1210, 1215, 1220 may be performed using the detection module 215 described with reference to FIGS. 2-6. The method 1200 may provide for detection of visitors and related functions using automation/security systems. It should be noted that the method 1200 is just one implementation and that the operations of the method 1200 may be rearranged or otherwise modified such that other implementations are possible.

In some examples, aspects from two or more of the methods 1000, 1100, 1200 may be combined and/or separated. It should be noted that the methods 1000, 1100, 1200 are just example implementations, and that the operations of the methods 1000, 1100, 1200 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for visitor detection using security and/or automation systems, comprising:
   initiating capturing a first plurality of images of a doorway prior to detecting a person and prior to actuation of a doorbell;
   detecting whether a threshold period of time has elapsed between initiating the capturing of the first plurality of images and detecting actuation of the doorbell;
   if the threshold period of time has elapsed:
   overwriting the first plurality of images of the doorway, the first plurality of images stored in memory associated with the security and/or automation system;
   deleting the first plurality of images of the doorway after the threshold period of time has elapsed; and
   initiating capturing a second plurality of images of the doorway;
   and
   if the threshold period of time has not elapsed:
   detecting a presence of the person located at a predetermined distance from the doorbell, wherein the person is detected using one or more biometric identification methods;
   detecting actuation of the doorbell after detecting the presence of the person;
   selecting a subset of images from the first plurality of images, wherein the subset of images comprises one or more images that were captured after detecting the presence of the person located at the predetermined distance from the doorbell, and prior to the actuation of the doorbell;
   identifying from the subset of images, a first image at the doorway, the first image being associated with the presence of the person at the predetermined distance from the doorbell;
   capturing a second image at the doorbell associated with the actuation of the doorbell;
   capturing a video at the doorbell associated with the actuation of the doorbell;
   delivering the first image with a notice of the presence of the person to a recipient for viewing; and
   automatically uploading the video for viewing upon capturing the video, the video being available for selective viewing by the recipient upon being uploaded.

2. The method of claim 1, wherein detecting the presence of the person includes detecting presence of the person at the doorway.

3. The method of claim 2, wherein detecting the presence of the person includes at least one of detecting motion, conducting facial recognition, conducting light contrast analysis, and conducting special analysis.

4. The method of claim 1, wherein detecting the actuation of the doorbell includes detecting operation of the doorbell by the person.

5. The method of claim 1, wherein capturing the second image includes capturing an image frame from the video spanning a time period that occurs prior to the actuation of the doorbell.

6. The method of claim 1, wherein capturing the second image includes capturing an image frame from the video captured after detecting the presence of the person.

7. The method of claim 1, wherein the video spans a time that precedes the detected actuation of the doorbell.

8. The method of claim 1, wherein the video is uploaded concurrently with delivering the notice.

9. The method of claim 1, wherein delivering the first image includes delivering the first image to a mobile computing device.

10. The method of claim 1, wherein delivering the first image includes delivering the first image to a control panel of the security and/or automation system.

11. An apparatus for visitor detection using security and/or automation systems, comprising:
a processor;
memory in electronic communication with the processor; and
instructions stored in the memory, the instructions being executable by the processor to:
initiate capturing a first plurality of images of a doorway prior to detecting a person and prior to actuation of a doorbell;
detect whether a threshold period of time has elapsed between initiating the capturing of the first plurality of images and detecting actuation of the doorbell;
if the threshold period of time has elapsed:
overwriting the first plurality of images of the doorway, the first plurality of images stored in memory associated with the security and/or automation system;
deleting the first plurality of images of the doorway after the threshold period of time has elapsed; and
initiate capturing a second plurality of images of the doorway; and
if the threshold period of time has not elapsed:
detect a presence of the person located at a predetermined distance from the doorbell, wherein the person is detected using one or more biometric identification methods;
detect actuation of the doorbell after detecting the presence of the person;
select a subset of images from the first plurality of images, wherein the subset of images comprises one or more images that were captured after detecting the presence of the person located at the predetermined distance from the doorbell, and prior to the actuation of the doorbell;
identify from the subset of images, a first image at the doorway, the first image being associated with the presence of the person at the predetermined distance from the doorbell;
capture a second image at the doorbell associated with the actuation of the doorbell;
capture a video at the doorbell associated with the actuation of the doorbell;
deliver the first image with a notice of the presence of the person to a recipient for viewing; and
automatically upload the video for viewing upon capturing the video, the video being available for selective viewing by the recipient upon being uploaded.

12. The apparatus for security and/or automation systems of claim 11, wherein the instructions are executable by the processor to detect the person at the doorway using at least one of motion detection, facial recognition, light contrast analysis, and actuation of a doorbell.

13. The apparatus for security and/or automation systems of claim 11, wherein the instructions are executable by the processor to:
receive a communication from the recipient in response to the notice; and
present the communication to the person.

14. The apparatus for security and/or automation systems of claim 11, wherein the instructions are executable by the processor to:
receive instructions from the recipient; and
operate a barrier to grant access to the person based on the instructions.

15. The apparatus for security and/or automation systems of claim 11, wherein the instructions are executable by the processor to:
capture the video prior to and after detecting the person.

16. The apparatus for security and/or automation systems of claim 11, wherein the instructions are executable by the processor to:
capture the second image from the video.

17. A non-transitory computer-readable medium storing computer-executable code for visitor detection using security and/or automation systems, the code executable by a processor to:
initiate recording a first video of an entry to a building prior to detecting a person and prior to actuation of a doorbell, wherein the first video comprises a first plurality of images of the entry;
detect whether a threshold period of time has elapsed between initiating the capturing of the first plurality of images and detecting actuation of the doorbell;
if the threshold period of time has elapsed:
overwriting the first plurality of images of the doorway entry, the first plurality of images stored in memory associated with the security and/or automation system;
deleting the first plurality of images of the doorway after the threshold period of time has elapsed; and
initiate capturing a second plurality of images of the doorway entry; and
if the threshold period of time has not elapsed:
detect a presence of the person located at a predetermined distance from the doorbell, wherein the person is detected using one or more biometric identification methods;
detect actuation of the doorbell after detecting the presence of the person;
select a subset of images from the first plurality of images, wherein the subset of images comprises one or more images that were captured after detecting the presence of the person located at the predetermined distance from the doorbell, and prior to the actuation of the doorbell;
identify from the subset of images, a first image at the doorway entry, the first image being associated with the presence of the person at the predetermined distance from the doorbell;
capture a second image at the doorbell associated with the actuation of the doorbell;
capture a video at the doorbell associated with the actuation of the doorbell;
deliver the first image with a notice of the presence of the person to a recipient for viewing; and
automatically upload the video for viewing upon capturing the video, the video being available for selective viewing by the recipient upon being uploaded.

18. The non-transitory computer-readable medium of claim 17, wherein the code is executable by the processor to:
obtain an image of the entry; and
transmit the image to the recipient for viewing.

19. The non-transitory computer-readable medium of claim 17, wherein the event includes actuation of a doorbell.

* * * * *